Sept. 25, 1923.

J. J. McDONALD 1,468,643

EXTERIOR RUBBER TIRE PROTECTOR

Filed Jan. 31, 1921     2 Sheets-Sheet 1

WITNESS
R.F. Dilworth

INVENTOR
John J. McDonald
By H.W. Stevenson
Attorney

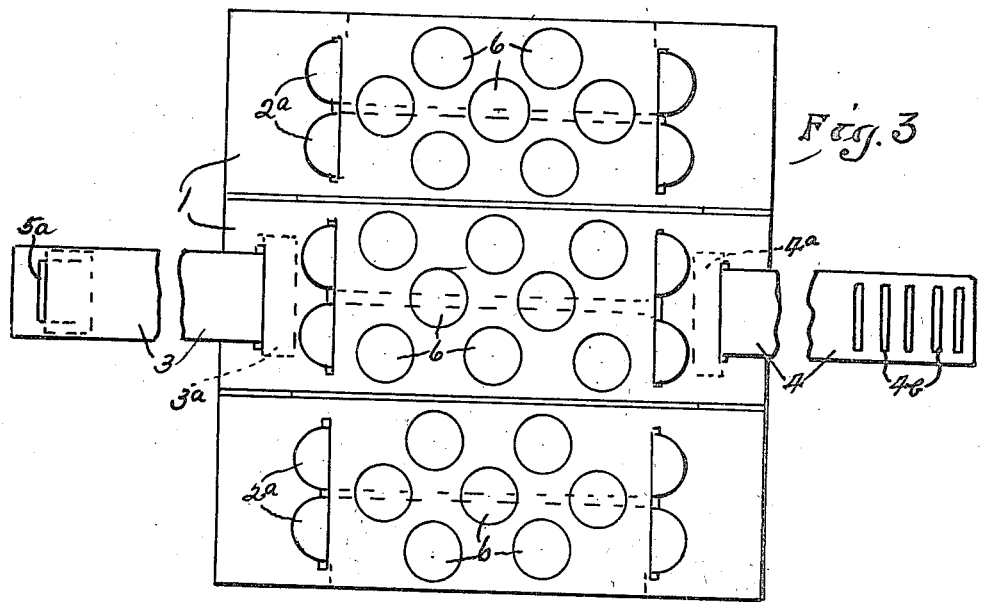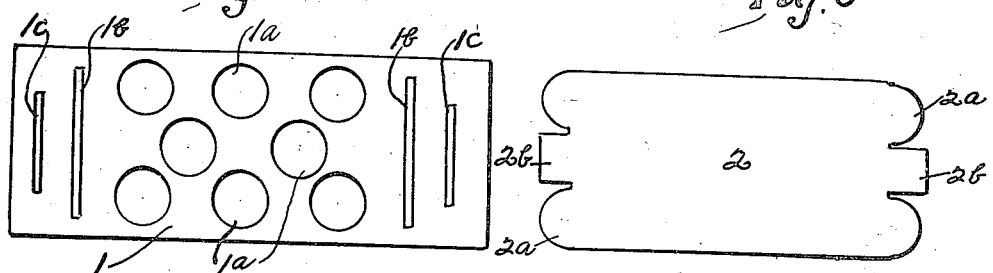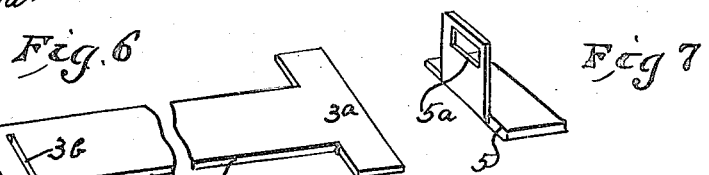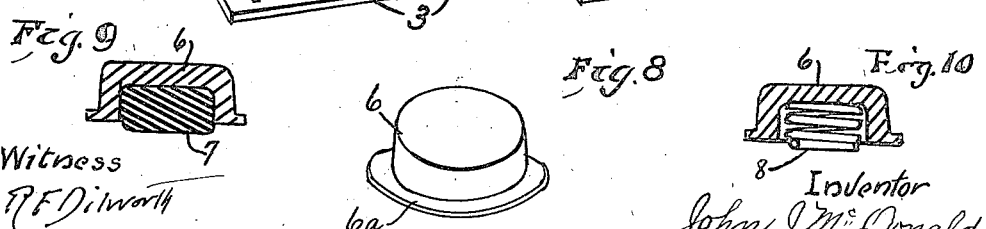

Patented Sept. 25, 1923.

1,468,643

UNITED STATES PATENT OFFICE.

JOHN J. McDONALD, OF WEST VIEW, PENNSYLVANIA.

EXTERIOR RUBBER-TIRE PROTECTOR.

Application filed January 31, 1921. Serial No. 441,182.

*To all whom it may concern:*

Be it known that I, JOHN J. McDONALD, a citizen of the United States, residing at West View, in the county of Allegheny and State of Pennsylvania, have invented a certain new and useful Improvement in Exterior Rubber-Tire Protectors, of which the following is a specification.

This invention pertains to the art of vehicle tires being particularly related to that branch commonly known as pneumatic tires and is designed primarily as an exterior protective means to guard against damage to the outside surface, or tread portion of the tire. By preventing wear and tear on the rubber material, as well as a protection against penetration by any sharp or cutting agency, such for instance glass, nails, tacks, stones or any other road or street hazard, it will very materially prolong the life and efficiency of the tire.

A further advantage resides in the non-skidding function of my invention whereby the need for or use of the well known chain expedient can be eliminated.

This invention is intended as an improvement over my pending application for tire and tube protector, filed January 11th, 1921, Serial Number 436,441, which invention involves some of the features incorporated in this present application, with special reference to the novel means employed for interlocking the segmental plate portions of the protector, said pending application, however, functioning in the interior of the tire, being designed as a protective agency for the inflatable inner tube, while this application involves construction intended as an exterior protection and wearing accessory for the rubber shoe casing or tread.

In the accompanying drawing I have shown one embodiment of my invention as applied to a rubber tired vehicle wheel, the same being merely illustrative, hence, subject to modification and amendment in the detail form of construction, therefore, I do not limit myself to the exact formation or assembly, reserving the right to make any necessary alterations or changes, that might be found expedient after a further reduction to practice, without departing from the original idea and intention, but which will confine the invention within the scope of the appended claim.

Referring then to said drawing. Figure 1 is a diagrammatical view of one style of rubber tire vehicle wheel, showing means for applying my invention thereto and embracing means for securely retaining and locking the protective members to the tread.

Figure 2 is a transverse sectional view through the tire and one segment of the protector showing the locking means.

Figure 3 is an assembled plan view of a segment of the protector, prior to being curved to form, illustrating the interlocking feature employed for uniting the plurality of non-puncturable plate members, and further showing strap means utilized for securing each segment of the protector against displacement, the plates at the end sections being partially shown, the same being cut off at the edge of the figure.

Figure 4 shows the blank or unbent form of one of a series of apertured and slotted members, while Figure 5 is a similar view of one of a second series of interlocking members provided with lug portions.

Figure 6 is a perspective view in broken formation of one of the securing strap members, while Figure 7 is a similar view of an L-shaped apertured locking member.

Figure 8 shows a flanged stud or renewable wearing element. Figure 9 is a modified form of wearing stud involving a resilient filler or insert and Figure 10 is another modified stud, comprising a coil spring insert.

Figure 1:
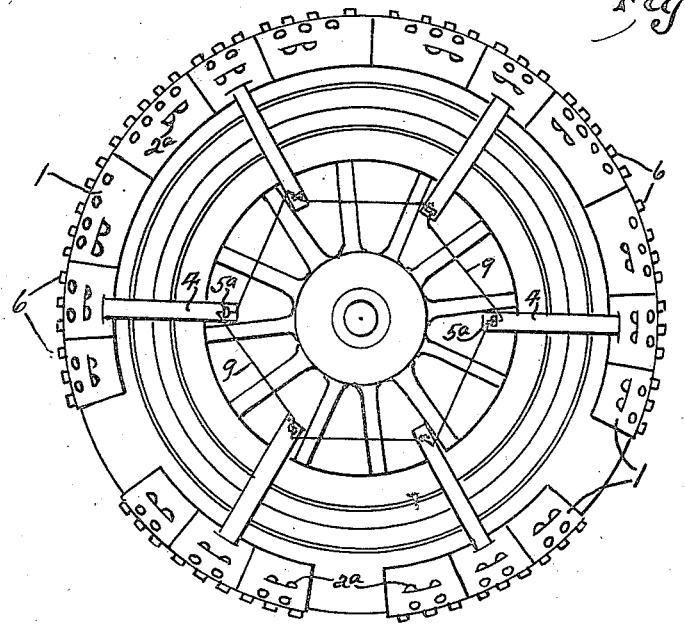
Figure 2:
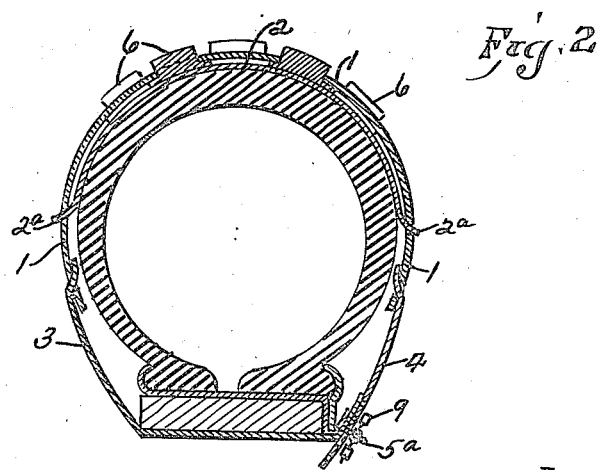

My improved exterior rubber tire tread protector is designed and constructed with a view to covering substantially the entire circumference of the tire, as clearly indicated in the upper half of the wheel shown in Figure 1, or it may be arranged to be more or less spaced apart and cover said tire at predetermined intervals, as shown in the lower half of the wheel illustrated in said Figure 1. In the event of said protective device being constructed in one continuous unit or band, it would preferably be lapped over at the two free ends, not shown, however, or if the protector is made in separated sections, each one would be independently applied and secured to the tire and wheel in the manner hereinafter described.

With reference to either one of the two above mentioned modified forms, the construction of each will embody a series of substantially contiguous curved or bent non-puncturable plate members 1, the approximate blank or unbent form of which is shown in Figure 4, and involves a plurality of apertures 1ª, of predetermined area and configuration, either circular, as shown, or any other substitute shape, also a member of transverse slots 1ᵇ, and 1ᶜ, respectively.

A second series of similarly shaped plates or segments 2, shown in Figure 5, is provided for removable and interlocking contact against one side and over-lapping the joints of the first mentioned series of apertured and slotted segments 1, these last designated plates being provided with a plurality of corner disposed extension members or lugs 2ª, whose function it is to be entered through the slotted portions 1ᵇ of the first mentioned series of segments in order to provide an interlocking union between the two series of segments and guard against longitudinal separation of the component segmental parts of the assembled tire protector, additional intermediate and centrally disposed lugs 2ᵇ formed on said plates functioning for contact with the opposite side of the plates 1 from the said lugs 2ª.

As a simple fastening or securing expedient for either the sectional protectors or the continuous unit band form, there is provided strap members 3 and 4 respectively, each one being furnished with a T-head portion 3ª and 4ª, in order that when said pair of straps are threaded or inserted through the slots 1ᶜ, they will be retained in interlocked attitude with the co-acting plate member 1, being thereby held against displacement when subjected to a pulling strain. One of said straps is provided near its outer free end with a transverse slot 3ᵇ, intended for the insertion therein of the apertured section 5ª of an L-shaped member 5, shown in Figure 7. In the assembling process, the aforesaid section 5ª is designed to be forced into and fit tightly within the receptive slot 3ᵇ, subsequent to seating the strap within the said slot 1ᶜ. The companion, and aligning strap 4, disposed at the opposite side of the assembled section from the aforedescribed strap 3, is furnished with a plurality or series of transverse take-up slots 4ᵇ, designed to receive the apertured member 5ª, carried by the said strap 3, thereby providing a very simple, but efficient, means for securely holding the protective member in immovable functioning position over the rubber tire, the manner of applying and affixing the device to the wheel being shown in Figure 1. Any suitable locking means, such as a small padlock, chain, wire, or other substitute expedient, can be utilized by inserting same through the apertured member 5ª, after the two straps have been drawn taut and the end sections thereof interlocked in the manner heretofore described and shown.

The apertures 1ª formed in the plates 1, the size or area and configuration being purely optional, are designed to receive the studs or flanged members 6, one of which is illustrated in Figure 8, and two modified forms thereof are shown in Figures 9 and 10, respectively, said studs being intended to fit tightly within their respectively apertures, but are preferably removable therefrom for purpose of replacement, as will be more fully set forth hereinafter. These said studs will be of substantially uniform size and project a predetermined distance above the periphery of said plates, preferably standardized for the various makes and varieties of rubber tire construction to which my protector is applied, the material entering into the construction thereof being metal, hard rubber, fiber, cork, or a combination of various materials as disclosed in Figure 9, which shows one of these studs as being made of metal and cored out to receive a filler of rubber, or some other more or less resilient substance 7, while in Figure 10, there is shown another modified construction of said wearing stud involving a coil spring insert member 8.

These said studs, besides having a driving fit within their respective seats, being entered therein prior to the assembling of the associated plate segments, will be further held against displacement by reason of the flanged portion 6ª, which will be given a more or less curvature to correspond with the contour of the lower disposed and contacting plate member 2, against which said flange has a bearing. Thus it is readily apparent that these said wearing studs cannot move out of their seats until worn off or broken, and only then, by forcibly driving or drilling them out for the purpose of renewal, which would necessitate the disassembling of the interlocked plate segments.

Practically all the wear will reside in these said renewable studs and as they can be manufactured in large quantities at a very small cost per unit, their renewal or replacement is possible at small cost to the consumer.

As a non-skid feature of my invention, these renewable studs will serve and function as a practical substitute for the well known link chains now so universally used as an important adjunct or accessory to the rubber tired vehicle wheels, said studs gripping the road or street surface and performing the identical function of the aforesaid link chains.

The plurality of radially disposed securing strap elements essential for retaining the series of individually applied protector sections, or else the continuous integral band, can be locked in immovable position by a single chain, wire or other flexible element 9, which may be threaded through the apertures of the members 5ª, as clearly shown in Figure 1, and the terminal ends of this preferably continuous chain or wire be adequately joined or locked together at any convenient position at the outer face of the wheel.

With the foregoing described objects in view, the same being properly constructed and assembled substantially as shown, my device, in any of its modified forms, will serve a highly useful purpose by protecting the rubber tire from direct and immediate contact with the road or street surface and still preserve the useful easy riding resilient function of the pneumatic shoe, materially prolonging the life of said shoe by reason of the fact that practically all the wear is assumed by my protective invention. The device can be easily and quickly applied by any driver or owner of any automobile or truck, and as readily removed for the purpose of renewing any of the wearing stud elements. It is applicable, likewise, to tires of the solid rubber type, used principally on trucks or heavy haulage vehicles, being applied thereto in practically the same simple manner as that described for the pneumatic type of tires.

I desire herewith to anticipate a modification in the detail construction of my invention pertaining to the arrangement or application of the wearing stud members, whereby these said elements can, if found necessary and expedient, be made an integral part of the carrying plates 1. not shown however, instead of being removably applied thereto as heretofore described. In event of this alteration or substitution, it would be necessary to renew the entire worn out or damaged plate 1 instead of simply renewing the unit studs, which would add something to the cost of replacement over that entailed of renewing the wearing stud members.

What I claim as my invention is:

An exterior rubber tire protector comprising a series of apertured and transversely slotted plate members, a second series of plates having corner disposed lugs for interlocking engagement with and covering the joints of the first mentioned series of plates, removable and renewable wearing elements projecting through the apertures of the first mentioned plates and bearing against the said second series of plates, and registering T-headed apertured strap members interlocking with the slotted plates for removably securing the protector in functioning position.

Signed at Pittsburgh, Pennsylvania, this 22nd day of January, 1921.

JOHN J. McDONALD.